United States Patent

[11] 3,586,031

| [72] | Inventors | Franz Muller;<br>Helmut Muller, both of Konigsteiner Strasse 132, Frankfurt/Main-Unterliederbach, Germany |
|---|---|---|
| [21] | Appl. No. | 800,228 |
| [22] | Filed | Feb. 18, 1969 |
| [45] | Patented | June 22, 1971 |
| [32] | Priority | Feb. 20, 1968 |
| [33] | | Austria |
| [31] | | A1611/68 |

[54] FLOW-CONTROL AND TESTING PLUG FOR PIPELINES
7 Claims, 13 Drawing Figs.

[52] U.S. Cl. ........................................ 137/199, 137/519, 138/89
[51] Int. Cl. ........................................ F16k 45/02
[50] Field of Search ........................................ 137/199, 517, 525, 519; 138/89

[56] References Cited
UNITED STATES PATENTS

| 2,544,476 | 3/1951 | Venning | 137/199 X |
| 3,421,534 | 1/1969 | Henderson | 137/199 |

*Primary Examiner*—Alan Cohan
*Attorney*—H. Gibner Lehmann

ABSTRACT: A flow control and testing plug adapted to be applied to a pipeline or the like for the purpose of pressure testing the same. The plug has a valving mechanism for preventing entrance of dirt or foreign matter and for controlling inflow and outflow of air into and out of the pipeline, such mechanism being operable either manually or automatically. The automatic operation of the valving mechanism is preferably effected by liquid which is pumped into the pipeline at another location and which expels the air therefrom through the valved plug.

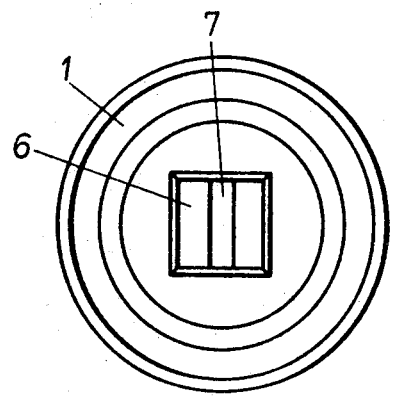
Fig. 8
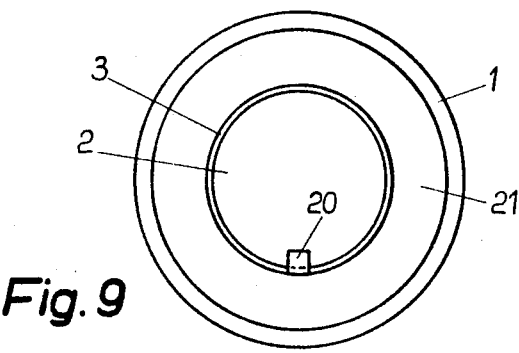
Fig. 9
Fig. 10
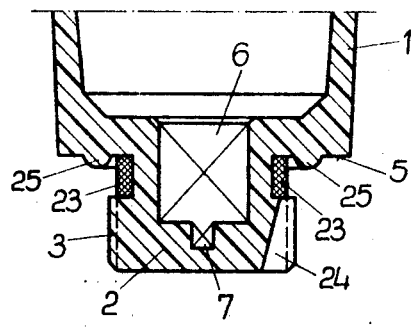

Inventors
FRANZ MÜLLER
HELMUT MÜLLER

3,586,031

FLOW-CONTROL AND TESTING PLUG FOR PIPELINES

BACKGROUND

This invention concerns itself with flow-control and testing plugs as they are used for temporary plugging of the open ends of pipelines installed in buildings, in order to carry out necessary pressure testing of the lines by means of fluid, and in addition to protect the lines against dirt and especially against penetration by foreign matter during the continued interior finishing of the building construction. After the completion of the interior finishing, such plugs are removed from the pipeline ends and fittings such as faucets and the like are installed.

Customarily these temporary stoppers or plugs are made of metal, being tightly screwed into the pipe ends with the help of oakum or other sealing fillers. However, such plugs are also known to be manufactured of plastic and sealed by washers or by tapered thread-sections at the end of the pipes. But all such known plugs have the disadvantage that the inflow and outflow of air, necessary in connection with pressure testing by liquid, presents difficulties at the ends of the lines. At present it is necessary, for the purpose of aeration and deaeration of the pipes, to considerably loosen the temporary stoppers or plugs singly at the pipeline ends, in order to permit the passage or bleeding of the air past the thread or other fastening devices.

SUMMARY

The above disadvantages and drawbacks of prior temporary stopper plugs are obviated by the present invention, which has for one object the provision of an improved pipeline stopper or plug which, on the one hand, will guarantee a secure temporary plugging of the open ends of pipelines, and which will on the other hand greatly facilitate the inflow and outflow of air in the pipes that is necessary in connection with pressure testing by the use of liquid.

According to the invention, this is achieved by equipping the plug with a controlled closing or valve mechanism for the inflow and outflow of air in the pipes. The valve mechanism can be manually controlled or operated while still insuring a firm, secure fit of the plug in the pipeline end. However, in accordance with the invention it is preferable to have the valve or closing mechanism arranged for automatic control by means of the testing liquid itself. In such case, all that is needed for carrying out the pressure testing is to pump the testing liquid into the pipeline. During such operation the affixed testing plug will automatically let escape the air which is being displaced by the fluid or liquid in the pipeline, and will automatically close as soon as the testing fluid reaches the pipe end and the plug. Even with the automatic valve mechanism, the closure or plug according to the invention can be manufactured especially simply and inexpensively.

In one embodiment of the invention, the plug is equipped with an air channel which is closed by a simple check valve. In this case, the check valve can be constructed for actuation automatically by the testing fluid. However, it can also be operated manually by means of a slender pin which is guided in the air channel, without having to loosen the plug. Within the scope of the invention, the check valve can then be constructed as a globe valve. It is also possible to have the check valve contain a gasket which is held on the surface of the plug that faces the interior of the line, the gasket being movable axially in front of a sealing seat and being pressed against the seat by the testing fluid. The sealing seat can then be constructed as a ring-shaped bulge on the end face of the plug, enclosed by a ring channel which is connected with the interior of the pipeline by essentially radial connecting channels that are located in back of the gasket at the end face of the plug. The gasket can be a small rubber disc, held within the area of its peripheral edge, and in the central area bulgeable towards the sealing seat against the action of its self-elasticity.

In another embodiment of the invention, the plug is arranged to have an air channel with a swelling seal which closes the channel by the effect of the testing fluid. The seal swells very rapidly as soon as the testing fluid reaches the area of the plug.

In still another embodiment of the invention, the plug has on the outside surface of the portion which is inserted into the pipe end, at least one essentially axial air channel that is closed by the outside seal of the plug. In this embodiment it is necessary, however, to loosen the plug a little for the inflow and outflow of air in the pipe so that the outside seal of the plug is far enough removed from the pipe end to let air escape from or enter into the pipe. Thus, freeing of the outside seal requires only a little loosening, as for instance one half or one full turn of the thread of the plug, so that even during the process of aeration and deaeration the plug is held securely in the end of the pipeline.

Within the scope of the invention, the outside seal of the plug can be constituted as a cone to be pressed into the outlet of the pipe. It is also possible to construct the outside seal of the plug in the form of a conical thread piece, preferably of a resilient material. Finally, the outside seal of the plug can also be constructed as a bulge- or lip-seal acting together with the edge of the pipeline outlet. In all of these cases, however, it is most desirable that the plug with its outside seal be made in one piece out of resilient plastic. Within the scope of the invention, the plug can be constructed with a sleeve-shaped exposed end as a recessed plug having a square socket to apply a socket wrench, or having a slit in which to apply a screwdriver. Some embodiments of the invention are further explained in the following text, on the basis of the drawings.

In the drawings:

FIG. 8 is a plan view as indicated by the line VIII–VIII of FIG. 6.

FIG. 9 is a bottom plan view as indicated by the line IX–IX of FIG. 6.

FIG. 10 is an axial sectional view of a plug constituting still another embodiment of the invention.

Figure 1:
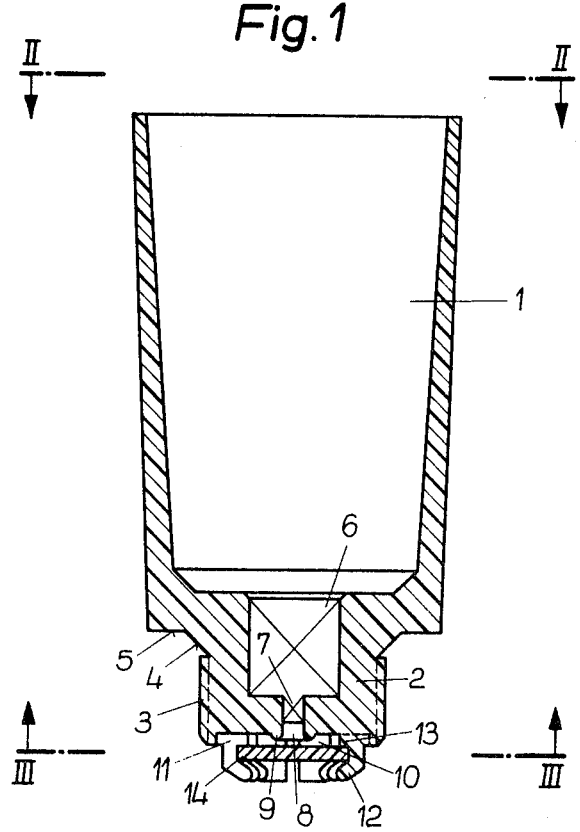
FIG. 1 is an axial section of a testing plug, taken on line 1–1 of FIG. 3, showing one embodiment of the invention.
Figure 2:
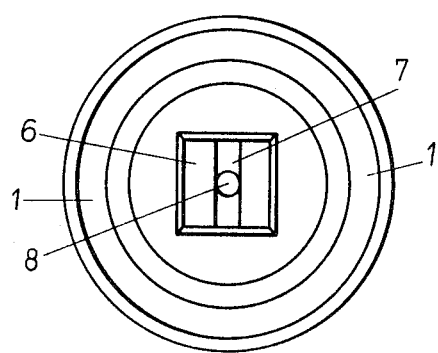
FIG. 2 shows the testing plug according to FIG. 1 in plan view, looking in the direction indicated on line II–II of FIG. 1.
Figure 3:
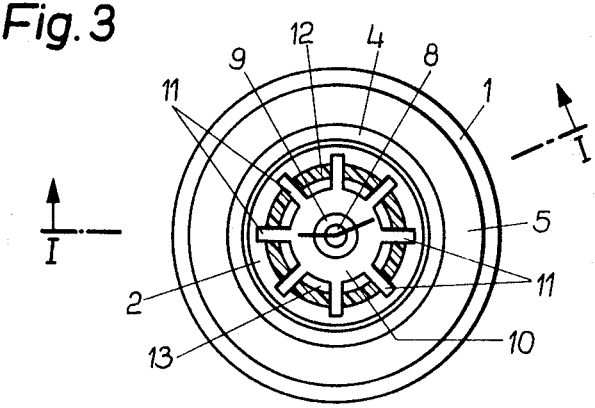
FIG. 3 is a section taken on line III–III of FIG. 1.

In the example according to FIGS. 1 to 3, the discharge and testing plug is constituted as a recess plug with a conically expanding sleeve 1 on its rearward (in the illustration of FIG. 1, upper) portion. On its front end it has a head 2 with an outside thread 3, adapted to be screwed into the open end of the pipeline. To the thread 3 is added a conical outside seal 4, arranged to be pressed into the pipe outlet, the seal 4 extending to a radial front collar 5 of the sleeve 1. Inside of the head 2, a square recess 6 is provided, in which to apply a socket wrench for tightening or loosening the plug. An additional slot or groove 7 is provided at the bottom of the recess 6 for the use of a screwdriver, if needed, as a tool for tightening or loosening the plug.

The screwdriver slot 7 is extended in a central borehole 8 which continues through to the front or inner end face of the plug. Here the borehole 8 is enclosed by a circular valve seat 9. All around this circular valve seat, a circular channel 10 is formed which communicates, by essentially radially extending channels 11, with the inside of the pipe into which the plug is screwed. In between the channels 11, clamping pins 12 with inward-bent tips are arranged, within which is placed an all-around support collar 13 that is interrupted by the channels 11. The support collar 13 is raised a little higher than the valve-seat ring 9 and supports a small rubber disc 14 (of circular shape in the illustrated example) which is inserted between the pins 12 and is held in an essentially level position due to its self-elasticity, as shown in FIG. 1.

When a testing fluid, usually water, is pumped into the pipeline which is sealed by the described plug, at first the air escapes from the pipe's interior through the channels 11 into the circular channel 12 and from there to the outside via the valve-seat ring 9, borehole 8 and sleeve 1. During this flowing process, the pressure-difference generated in back of the rubber disc 14 is not sufficient, due to the air pressure acting on the front of the rubber disc, to press it down against the seat ring 9. However, as soon as the water or liquid reaches the disc 14, namely the inside of the plug, the pressure-difference built-up through the arrangement of the channels 11 and the circular channel 10 is sufficient to press the disc 14 against the seat ring 9. Thereby, the plug is closed and seals the line sufficiently tightly against any discharge of liquid during the testing process. When the testing pressure is relieved again and the testing fluid drained off, the disc 14 will again lift itself off the seat ring 9, letting outside air flow in through the sleeve 1, the square or recess 6, the screwdriver slot 7, the borehole 8 around the seat ring 9 into the circular channel 10. From there, the air flows through the channels 11 into the pipe interior.

Figure 4:
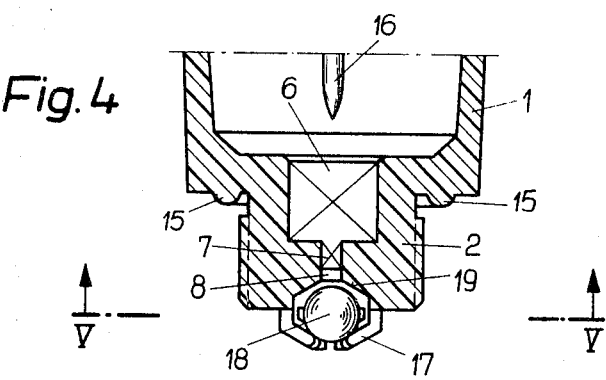
FIG. 4 is a partial section corresponding with FIG. 1, but showing a somewhat modified form of the invention.
Figure 5:
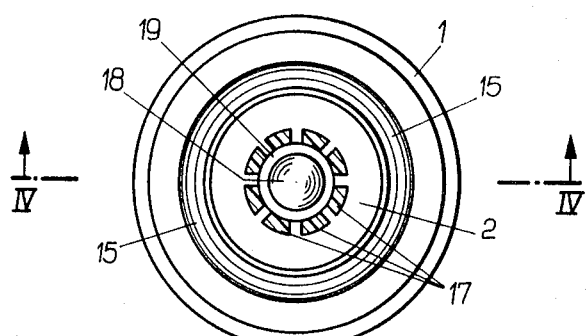
FIG. 5 is a section taken on line V–V of FIG. 4.
Figure 6:
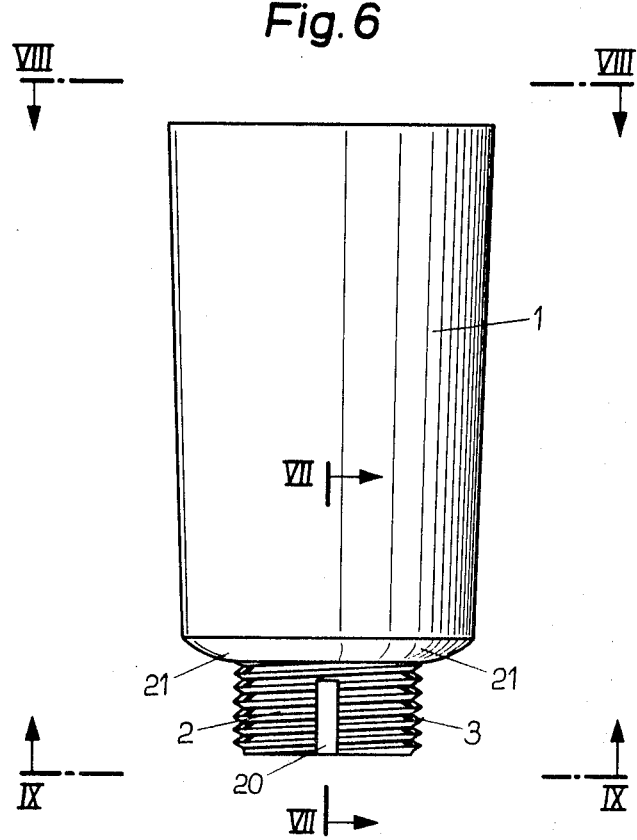
FIG. 6 shows a third construction of plug according to the invention, in side view.
Figure 7:
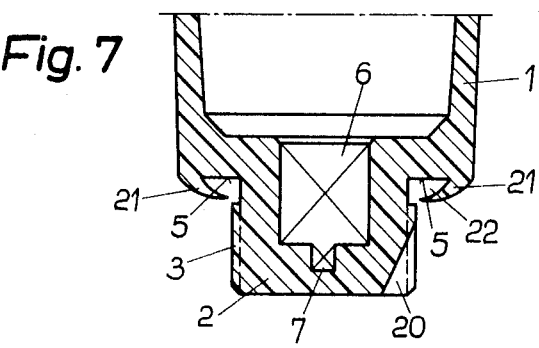
FIG. 7 is a section taken on line VII–VII of FIG. 6.

In the example of FIGS. 4 and 5, the plug is constructed in a way similar to that described above, namely with a sleeve-shaped part 1 on whose front end a head 2 is formed. The head 2 again has the inner square recess 6, the screwdriver slot 7, and the axial borehole 8. In this example, the borehole 8 which forms the air channel, acts together with a globe check valve. For this purpose, a tapered borehole 19 in the front end face of the plug head 2 forms a valve seat 19. The valve ball 18 is held at a distance by the pins 17 which are constructed on the end face of the head 2. In this embodiment too, the pins 17 have inward-bent ends and are made in one piece with the head 2 of the plug, out of resilient plastic. Therefore they can be temporarily bent outward far enough so that the ball 18 can be inserted in between them. The maximum distance between the ball 18 and the tapered valve seat 19 can be adjusted so that thereby, with an increase in air pressure, the ball will not get pressed against its seat but will let the air escape. But as soon as fluid or liquid reaches the area of the check valve, the valve will get pressed against its seat 19. When the pressure inside the pipeline is released and the fluid drained off, the valve ball 18 will fall away from its seat 19 again, letting air stream into the pipeline interior.

Unlike the embodiment according to FIGS. 1 to 3, the plug in the example according to FIGS. 4 and 5 does not function automatically in a downward position. However, it is possible easily to press the check valve 18, 19 off its seat from outside, by means of a slender pin 16. For this purpose, the pin 16 is guided to the ball 18 through the borehole 8. A similar pin can also be provided in the example of FIGS. 1 to 3 for checking whether all the air has really been emptied out, or for the removal of residual air bubbles which have accumulated behind the check valve after it has responded.

In the example of FIGS. 4 and 5, the outside seal of the plug is constructed as a bulge seal 15 on the end-facing collar of sleeve 1. This bulge seal sits against the end face of the pipe to be closed.

In the embodiment of FIGS. 6 to 9, the plug is again equipped with a rearward sleeve 1 and a plug head 2 to be screwed into the pipe. Inside of the plug head 2, there is again the recess or inner square 6 for applying a tool and the slot 7 for applying a screwdriver. But the plug head 2 is no longer equipped with an axial borehole. In this example, the air channel is formed by a lateral axial outside groove 20 on the plug head 2 which extends to about three-fourths of the thread 3. Thus the air inside a pipeline can escape to the outside through the remaining thread during the pumping-in of water. Supplementing this valve-groove 20, a lip seal 21 is provided, which forms a circle all around the end-facing collar 5 of the sleeve 1, and which lies against the end face of the pipe to be closed. In this connection, the lip seal 21 has the special advantage that it swells as soon as fluid, for instance water, enters the ring-space 22 formed between it and the collar 5. Thereby, further escape is first cut off, and then the plug can be tightened fast for the remaining time of the pressure-testing of the line.

To drain the testing fluid, the plug is loosened again so that the air can reenter the pipeline's interior through the remaining turns of the thread 3 and the groove 20.

A variation of this just-described embodiment is shown in FIG. 10. Here, between the end of the thread 3 and the end-facing collar 5 of the sleeve 1, a ring-shaped swelling seal 23 is set. The seal 23 consists of a material that absorbs the approaching testing fluid, for instance approaching water, thereby swelling outward radially. In the example of FIG. 10, the radial groove 24 which forms the air channel, extends over the whole thread 3 and to the swelling seal 23, so that the seal is constantly under the influence of the testing fluid as long as it remains at the end face of the plug. In the example of FIG. 10 an added ring-shaped bulge seal 25 is attached to the radial collar of the sleeve 1. To close the pipe end, the plug with its thread 3 is screwed into the pipe up to the point where the ring-shaped bulge seal 25 stays a short distance away from the faced end of the pipe. When water is pumped into the pipe for testing the pipeline, the air escapes from the line through the groove 24 past the swelling seal 23 and the sealing bulge 25 to the outside. As soon as fluid reaches the area of the plug, it approaches the swelling seal 23 through the axial groove 24, causing the swelling seal to swell radially outward so that it presses against the outside part of the pipe's thread. Thereby, only a very minute quantity of fluid can seep out until the swelling seal responds. Then, in order to keep the pressure constant inside the pipeline during the testing period, the plug can be tightened fast so that it forms an additional seal with its sealing bulge 25 on the end face of the pipe to be closed.

In order to blow in air, the plug in this example is to be unscrewed from the pipe to the point where the rearward end of the axial groove 24 becomes free, and the swelling seal 23 leaves the pipe's area completely. Tightening and loosening of the plug is accomplished here again by means of the inner square recess 6 accommodating a socket tool, or by means of the screwdriver slot 7.

In the examples according to FIGS. 6 to 10, only one air slit 20 (or 24) is shown, but it is also possible instead to distribute several slits on the circumference of the plug head 2.

Figure 11:
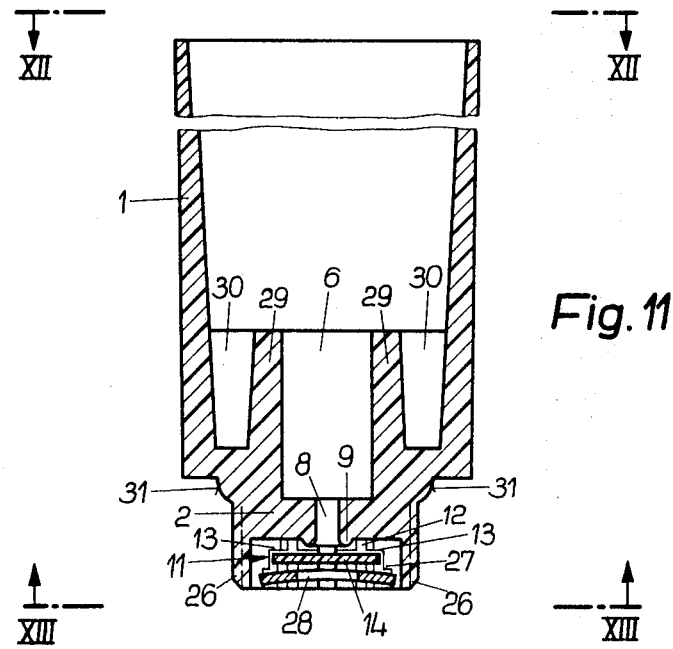
FIG. 11 is an axial sectional view of a plug constituting still another embodiment of the invention similar to that of FIGS. 1 to 3.
Figure 12:
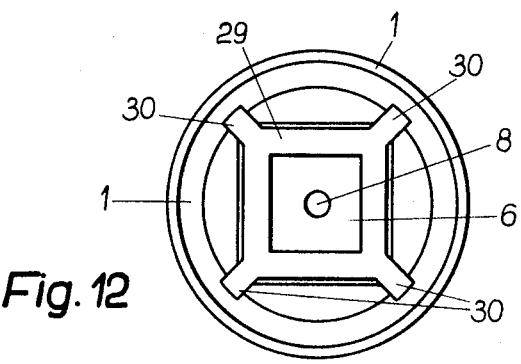
FIG. 12 is a plan view of the plug according to FIG. 11, as indicated by the line XII–XII of FIG. 11.
Figure 13:
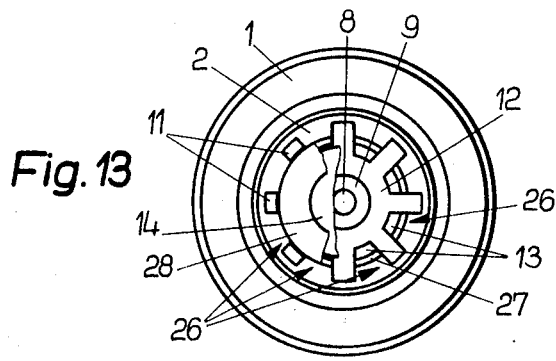
FIG. 13 is a bottom plan view according to the line XIII–XIII of FIG. 11, showing a partially broken-off gasket and ring disc.

The example according to FIGS. 11 to 13 proceeds from the basic design of the plug according to FIGS. 1 to 3. Therefore the same reference marks have been entered in FIGS. 11 to 13 as those for the same parts in FIGS. 1 to 3, and in this connection reference is made to the above description of FIGS. 1 to 3.

Differing from the example according to FIGS. 1 to 3, there are axially extending appendices 26 constructed on the end face of the plug head 2, instead of the inward-bent clamping pins. These appendices 26 are arranged alternately with the channels 11 in the manner of a crown. The channels 11 discharge at their inward ends into a circular channel 12 which encloses the seat ring 9 and the borehole 8, while the appendices 26 have at their inward ends support collars 13 for the small rubber disc 14 serving as gasket, and in their central area they have support collars 27 for a ring disc 28 that is to be pressed in between the crown of appendices 26 from the direction of the end face. This ring disc 28 holds in its area of circumference the rubber disc 14 in between the crown of appendices 26 upon their collars 13. In this way, the insertion of the rubber disc 14 between the crown of appendices 26 is considerably simpler than in the example of FIGS. 1 to 3, as the ring disc 28 can be inserted after the insertion of the rubber disc 14 and, as shown in FIG. 11, can easily be bulged inwards so that it wedges in between the appendices 26. To replace the rubber disc 14, the ring disc 28 can also be extracted axially again. The method of operation of the discharge-and testing-plug according to FIGS. 11 to 13 is the same generally as that of the discharge- and testing-plug according to FIGS. 1 to 3.

As a further variation of the plug of FIGS. 1 to 3, in the example of FIGS. 11 to 13 the inner square recess 6, provided for the application of a tool, is essentially enclosed by a square sleeve 29 which is braced by four wings 30, placed on the corners, opposite the peripheral wall of the plug 1. In this manner the inner square recess 6 can be constructed much deeper, so that it presents a greater area of contact to the inserted tool. Besides, it is no longer necessary to sink the recess so deeply into the area of the plug head; thus the plug head 2 can have a more sturdy construction. Finally, unlike the example according to FIGS. 1 to 3, the outside seal 31, to be pressed into the pipe outlet, is constructed in a somewhat convex bulging shape.

All features of the object of the application which are illustrated in the description, the drawing, and the patent claims can be of essential significance for the invention either singly or in every conceivable combination.

We claim:

1. A discharge and testing plug for the temporary closing of the open ends of pipelines during pressure testing by liquid and during the continued interior finishing of building constructions comprising a plug body having means for securing it to the pipeline end and having an air passage means for permitting the outflow of air past it, said body having a controlled closing device for shutting off said air passage means, thereby to enable deaeration and aeration of the pipeline, said closing device being capable of automatic actuation by liquid which is brought into the pipeline and comprising a check valve including a sealing seat on the plug body and a gasket held on that end surface of the plug which is facing the interior of the line, said gasket being axially movable elastically in front of the sealing seat and being pressed against the sealing seat by the pressure of the testing liquid in the pipeline, said sealing seat comprising a ring-shaped bulge on the said end surface of the plug, said plug having a channel means surrounding the bulge and having a connecting channel disposed in back of said gasket for connecting the channel means with the interior of the pipeline.

2. A discharge and testing plug according to claim 1, characterized by the fact that the gasket is a small rubber disc held within the area of its peripheral edge, said disc in its central area being bulgeable towards the sealing seat, against the effect of its self-elasticity.

3. A discharge and testing plug according to claim 2, characterized by the fact that there are means comprising a crown of clamping pins with inward-bent tips, disposed on the end face of the plug for holding the gasket within the area of its peripheral edge.

4. A discharge and testing plug according to claim 2, characterized by the fact that there are means comprising a ring disc inserted in the end face of the plug body, for holding the gasket within the area of its peripheral edge.

5. A discharge and testing plug according to claim 1, characterized by the fact that the plug body has at least one essentially axial air channel, and has an outside seal in its outside surface which is to be inserted into the pipeline end.

6. A discharge and testing plug according to claim 5, characterized by the fact that the outside seal of the plug body comprises a bulge seal adapted to coact with the outlet-edge of the pipeline.

7. A discharge and testing plug according to claim 6, characterized by the fact that the plug body and said outside seal is constituted in one piece out of resilient material.